(12) United States Patent
Chen et al.

(10) Patent No.: US 7,999,728 B2
(45) Date of Patent: Aug. 16, 2011

(54) GRANULARITY CONTROL IN PUBLISHING INFORMATION

(75) Inventors: Can Feng Chen, Beijing (CN); Panu Akerman, Tampere (FI); Yu You, Kangasala (FI); Wendong Wang, Beijing (CN); Yali Cai, Beijing (CN)

(73) Assignee: Nokia Corporation, Espoo (FI)

( * ) Notice: Subject to any disclaimer, the term of this patent is extended or adjusted under 35 U.S.C. 154(b) by 253 days.

(21) Appl. No.: 12/276,908

(22) Filed: Nov. 24, 2008

(65) Prior Publication Data

US 2010/0127921 A1 May 27, 2010

(51) Int. Cl.
*G01S 19/42* (2010.01)
*G06Q 99/00* (2006.01)

(52) U.S. Cl. .................. 342/357.25; 705/319

(58) Field of Classification Search ............... 342/357.2, 342/357.25, 357.44; 705/319; 709/203; 455/456.1, 456.2

See application file for complete search history.

(56) References Cited

U.S. PATENT DOCUMENTS

| 7,224,987 | B1 | 5/2007 | Bhela et al. |
| 7,305,365 | B1 | 12/2007 | Bhela et al. |
| 2005/0177385 | A1 | 8/2005 | Hull et al. |
| 2007/0082680 | A1 | 4/2007 | Fish |
| 2008/0172458 | A1 | 7/2008 | Middleton et al. |

OTHER PUBLICATIONS

International Search Report and Written Opinion of corresponding International Application No. PCT/FI2009/050934 dated Mar. 3, 2010, pp. 1-15.

*Primary Examiner* — Dao L Phan
(74) *Attorney, Agent, or Firm* — Ditthavong Mori & Steiner, P.C.

(57) ABSTRACT

A system and method for sharing user information between online services may determine a degree of relationship between the services to determine how much, and what precision level, of user information should be shared. In one example, the user information may be global positioning system (GPS) location information for the user, and requesting users (or systems) receive different levels of the location information based on their respective relationships to the user and/or the user's online information service. The relationship between services may be user-defined using onscreen graphical tools. The determination may also include determining the levels of activity of users at the services, whereby information regarding less active users is less detailed than information regarding active users.

19 Claims, 10 Drawing Sheets

GRANULARITY CONTROL IN PUBLISHING INFORMATION

FIELD OF THE SPECIFICATION

The present application relates generally to the field of providing presence and activity data of users in numerous communication services and channels based on relationships between the communication services and between the users.

BACKGROUND

Online social networking and communication services have become new forums for people to converse, socialize, and do business remotely without the need for face-to-face meetings. Mobile communication technology has also furthered ways in which individuals socialize by enabling communication while on the go. Such services and technologies provide users with instantaneous and continuous access to any other user or to any number of users simultaneously. However, these new means of remote communication often lack many of the social cues one gets when individuals are communicating in the same place. Various methods have come about that, to some extent, help make up for the lack of social cues. One such method is to exchange between individuals, or to publish on social communication networks, presence and activity information of the individuals. As an example, such information may inform others about the level of activity and attentiveness of an individual in a social communication network or about an individual's current availability to converse.

Many types of presence and activity information have been developed and some standards have emerged that attempt to formalize the structure of such information. For instance, the Internet Engineering Task Force (IETF), a professional community which develops and publishes standards pertaining to Internet use, has published RFC 4480, a specification that defines several types of rich presence data. Another standardization effort is known as Attention Profiling Markup Language (APML) attempts to provide a format for exchanging attention information and can be found at the URL http://apml.pbwiki.com.

The typical way in which such information is disseminated is to turn broadcasting of the information either "on" or "off" for others to see. Additionally, when a user is broadcasting presence or activity information and is logged into multiple social networking services, other users of the different services typically see the same information. No clear ways have emerged to control a fine level of detail, or granularity of the information or to control the dissemination based on which social communication services and networks the user is present.

SUMMARY

The present application provides systems and methods for providing different levels of user information to requesting users and/or systems, based on a variety of relationships and levels of activity. In one embodiment, a user's information may be divided into various levels by the user. When the user's information service receives a request for the user's information, the service may determine what level of information to provide by examining the various relationships and activity levels.

The activity levels may refer to a user's level of activity with a given online place (e.g., website). If the user is more active at the website, then more detailed information about that user may be supplied to other users of the service. Conversely, if a user is inactive at the website, then the website may simply present generic, less-detailed information in response to the request.

The user may also define degrees of relationships between websites. When a user at a first website requests information about a second user at a second website, the degree of relationship between the two websites may be taken into account when determining what amount of information to provide.

Various types of user information may be defined, and divided into levels. One type is location information, such as that provided by global positioning systems (GPS). If a first user requests GPS location information of a second user, the second user's service may first determine a degree of relationship between the users and/or their respective online services, and the precision of location information may be varied depending on that degree of relationship. For example, close friends and family may receive precise coordinates or identifications of specific buildings, while distant friends and mere acquaintances may only receive generalized location information, such as an identification of a city, or of a larger geographic area.

These and other features are described in more detail below.

BRIEF DESCRIPTION

A more complete understanding of the features described herein and the advantages thereof may be acquired by referring to the following description in consideration of the accompanying drawings, in which like reference numbers indicate like features, and wherein.

DETAILED DESCRIPTION

In the following description, reference is made to the accompanying drawings, which form a part hereof, and in which is shown by way of illustration various features that may be used. It is to be understood that other embodiments may be utilized and structural and functional modifications may be made without departing from the scope and spirit of the present application.

Figure 1:
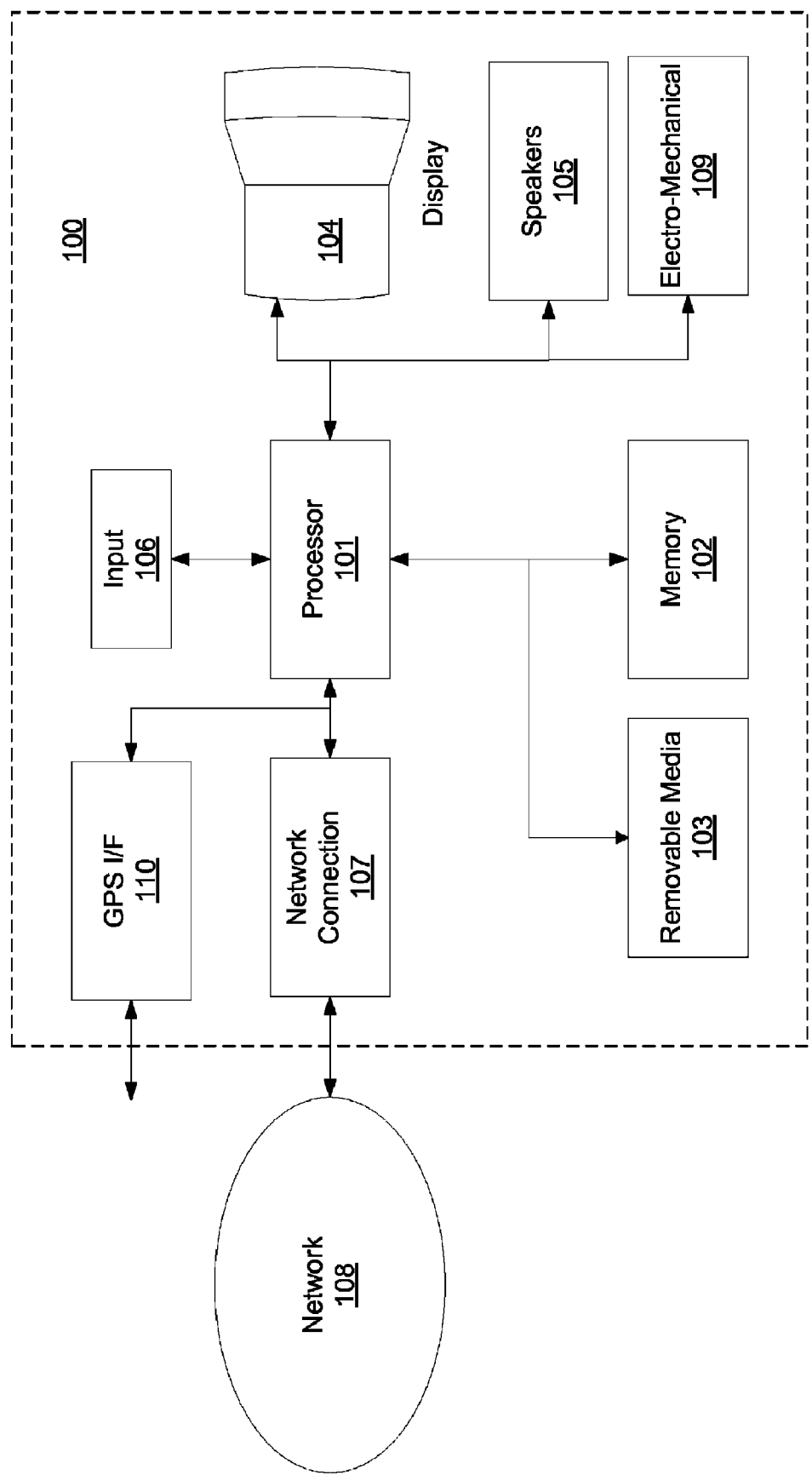
FIG. 1 illustrates basic components of a computing system on which features described herein may be implemented.

FIG. 1 illustrates, in one aspect, basic components of a computing system on which features described herein may be implemented. The system 100 may take the form of a general purpose computer, such as a personal computer, mainframe computer, network based server, etc. Alternatively, system 100 may be implemented as any other fixed or mobile electronic device, such as a mobile cellular telephone, mobile communication device, personal data assistant (PDA), pager, TV device, music player, AM/FM/digital radio receiver, video player, etc.

The system 100 may have one or more processors 101, such as a programmable logic device or microcontroller, which comprise logical structure, and may optionally execute instructions, to provide features described herein. The instructions (and other data described below) may be stored as computer-readable instructions on one or more memory devices 102, which may be dynamic and/or static random access memories (RAM), read-only memories (ROM), magnetic or optical disk, or any other desired computer-readable storage device. The instructions may also be computer-readable instructions received over a network 108 and through a network interface 107. The system 100 may also include one or more removable media 103 that can also store any of the data described herein (e.g., computer-readable instructions, data described below, etc.). The removable media 103 may be any desired type, such as removable FLASH memory, disk drives, optical or magnetic disks, etc.

The system 100 may be used to host a social communication service. A social communication service, also referred to herein as a place, may be any communication service that a user may access through a network and maintain a presence, such as an online chat service, webpage, bulletin board system, email server, professional or social networking service, photo sharing service, peer-to-peer service, etc. The services may provide real-time and non-real-time communication and the communication may be one-way or two-way between users of the services. The system 100 may also serve as a user interface to a local or remote server that provides social communication services or social communication channels. As such, the user may make requests for information about another user or may provide information about itself (e.g. location of the user) to another user who is requesting information. As a user interface, the system 100 may also include features, such as a Global Positioning System Interface 108 or other location enabling device, to enable the determination of the user's location. The system 100 may also be a repository or server in which users retrieve and store information (e.g. storing a user's privacy preferences) or which performs calculations necessary for carrying out features described herein (e.g. determining the relationship between two communication services, or determining the activity of a user in a communication service). The system 100 may perform a combination of any of these functions. For example, in a peer-to-peer service, system 100 may host a communications service, serve as a user interface, serve as a repository for data, and perform the calculations necessary for carrying out features described herein. As an alternate example, the features described herein may be performed in a distributed fashion by a number of systems similar to system 100.

To interact with the user, the system 100 may include one or more user input devices 106 and one or more output devices. The user input devices 106 may be, for example, alphanumeric push buttons on a keyboard (e.g., desktop computer keyboard, mobile telephone keypad, etc.), touch and/or capacitive-sensitive pads on a laptop, computer mouse, trackball, stylus on a sensitive input area or display, motion sensors, video camera, etc. The output devices may include video output devices 104, such as a monitor display, television, or electronic paper, which can display user interfaces of various services and programs, video, text, or other visible information to the user. The output devices may include one or more speakers 105, which can be used to play audio tracks, voice communications, audible cues, or other audible information for the user. The output devices may also include electromechanical devices 109 for inertial and motion feedback to the user.

The user may further interact with the system 100 remotely through the network 108 and network interface 107. Network connection 107 may be any form of computer interface. For example, a system 100 may be a personal computer connected to the Internet through a wireless interface (such as WLAN, Bluetooth, WIMAX), Ethernet wired connection, cable modem, etc., and network connection 107 may include any of these elements. If system 100 is implemented in a mobile telephone, network connection 107 may include the radio-frequency (RF) wireless circuitry used to allow the phone to communicate data to and from an external cellular telephone network or satellite network. If system 100 is implemented in an audio/video player or TV device the network connection 107 may include circuitry and/or receiver used to allow the system to receive signals from analog/digital radio/video/TV networks. The network 108 to which the system 100 communicates may then be the Internet, a telephone network (e.g., mobile or public-switched), cable television, satellite, or any other desired network. The network 108 may comprise any multiple of the same or different types of networks and network connection 107 may be configured to enable communication through the multiple networks.

Features described herein generally relate to determining what, and how much, information about a first user is to be shared with a second user when both users are interacting with online places, or websites, on a communication network such as the Internet. As will be explained in the examples below, that information can be more or less granular depending on a variety of factors. One factor may depend on the users' levels of activity at their respective websites. A website might reveal, to other users at the website, more information about users who are active at that website, and less information about users who are less active or idle at the website. So, for example, if a user is requesting to see information about various other users at a social networking website, the user can avoid seeing detailed information about people who are not active on the site.

Another factor may be a degree of relationship between users. For example, users who are family or close friends may allow more of their personal information to be shared with one another, than with remote acquaintances or strangers. The degree of relationship between users may be defined by the users themselves, using whatever degrees are defined and supported by the software running the website.

Another factor may be a degree of relationship between the online places or websites. For example, two online places that are closely related in terms of the service they provide (e.g., two online dating places) may share more information about their users than with other places that are different. The degree of relationship between online places may be defined individually by the users as well, although the relationships may also be defined automatically by the places themselves.

Figure 2A:
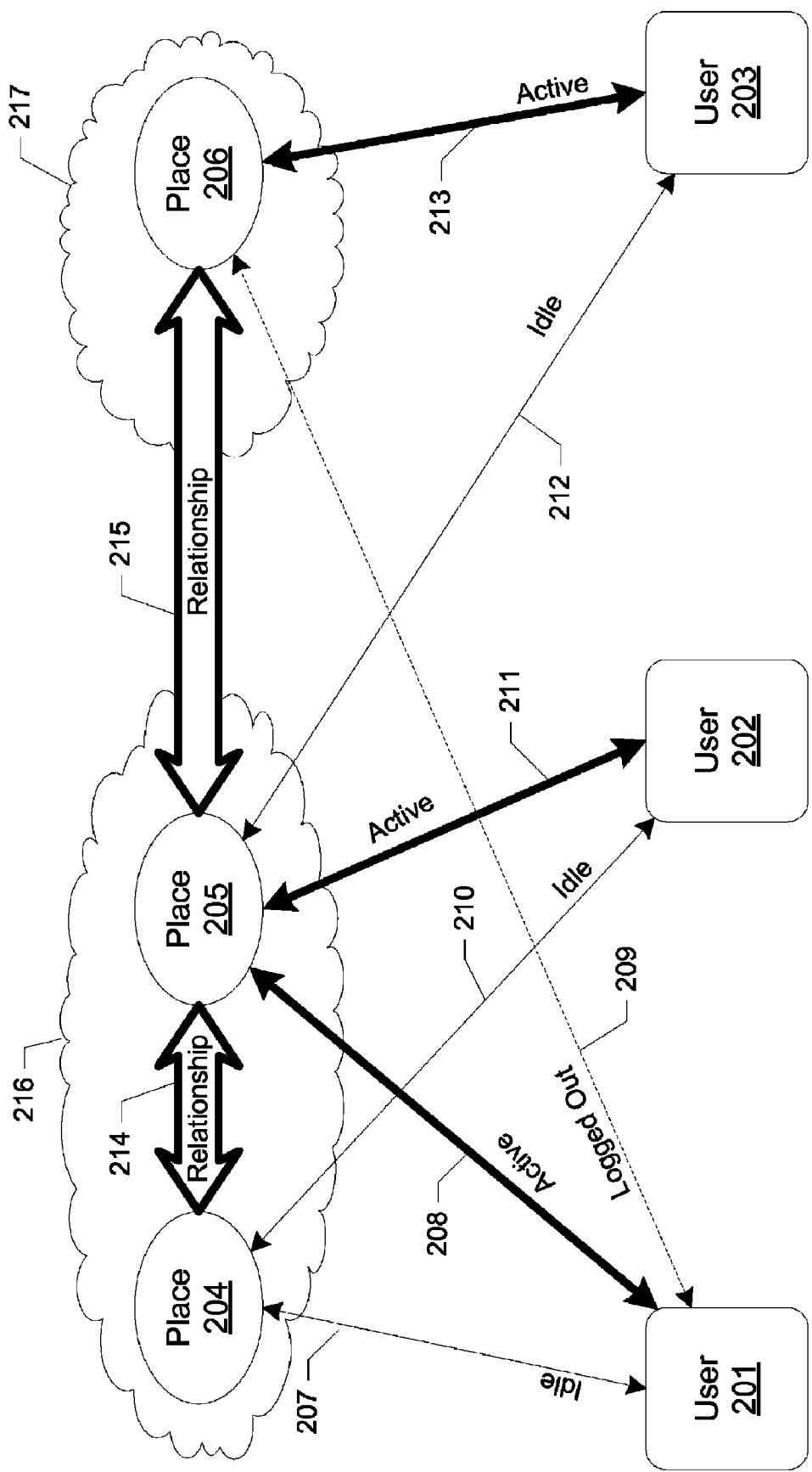
FIG. 2a illustrates example relationships of multiple communication services and multiple users of the services.

FIG. 2a illustrates examples of basic relationships between communication services and users of the communication services. Social communication services 204, 205, and 206, also referred to as "places," may be software applications, often web-based, that facilitate one-to-one or group communication between people through communication networks 216 and 217. Exemplary places include instant messaging (IM) systems, Internet relay chat (IRC) systems, online chat services, text messaging services, webpage servers, bulletin board systems, social networking websites, online community websites, email servers, professional networking services, photo sharing services, people locator services, etc.

Exemplary places may also include service aggregators which coordinate a user's memberships and activities across several individual places.

Users may enter a place, such as an Internet site, by logging into the site's server, and from there the user may send and receive communications to and from a multitude of other users. Those communications may be of any desired type. The communication may be real-time (e.g., an online chat room) or non-real-time (e.g., an email service, message board, etc.).

Some places may simply allow open, general, exchanges of any desired type of information (e.g., an open chat room). Other places, however, may have a target for the types of communications they encourage or attract. Some places may target communication among specific classes of contacts (e.g. a private members-only place, or places designated for personal or professional contacts), categories of people (e.g., plumbers, network administrators, etc.), or topics of communication (e.g. football, crafts, self help, job searching).

The place itself may be a software application that is physically hosted in a single system at a single location, like System 100, or may be distributed across multiple systems at multiple locations in a single network or in multiple networks. Further, several places may also reside on a single system. The places may reside on the systems directly used by users to access the network or may reside on different systems in the network that are remotely accessed by the users through the network.

Places 204-206 may be interconnected via one or more communication networks. Exemplary communication networks 216 and 217 include intranets, internets, the Internet, cellular, or public-switched phone networks, satellite networks, radio or TV networks, DVB networks, etc. As illustrated, multiple places may exist on the same network (e.g., network 216) or may exist on different networks.

Users 201, 202, and 203 may utilize one or more places to different degrees, and may have different levels of "activity" in those places. As will de described below, those levels of activity can help determine what type of information about one user gets shared with another user.

The FIG. 2a example uses lines 207-213 to show various users being more, or less, active at different places. User 201 is active at place 205, idle at place 204 and logged out of place 206. User 202 is active at place 205 and idle at place 204. User 203 is active at place 206 and idle at place 206.

Figure 2B:
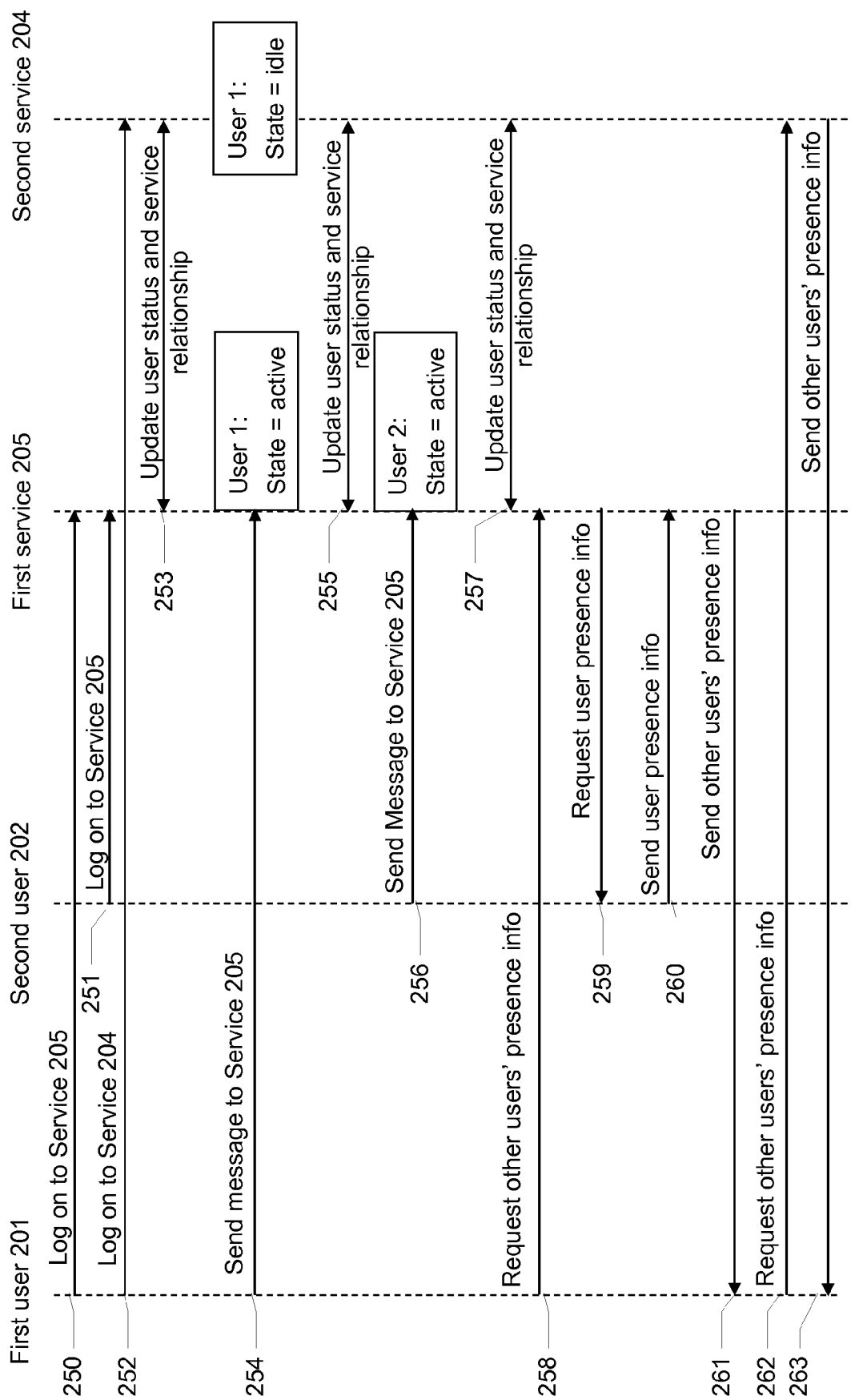
FIG. 2b illustrates an example communications flow for users using communication services.

FIG. 2b illustrates an example communication flow of users 201, 202 interacting with places or communication services 204, 205. In the example flow, user 201 may first log on to place/service 205 in step 250, user 202 may log on to the same place/service 205 at step 251, and user 201 may log on to place/service 204 in step 252. After the users have logged in, the place/services 204/205 may communicate with one another in step 253, to update the status information of their various respective users, and to determine the degree of relationship that exists between the two places/services 204/205 (degrees are discussed in greater detail below).

In step 254, user 201 may send a message to, or otherwise interact with, place/service 205. That place/service 205 may, in response, register that user 201 is active at that place/service (such state information may be stored in a memory file or database at a computer hosting the place/service 205). The other example place/service 204 may also register state information for the user 201, indicating that the user is idle.

In step 255, the places/services 204/205 may once again exchange user status information with one another. This exchanging may serve to update the users' state information, and may be performed after each action taken by a user, or at a periodic interval (e.g., once every 5 minutes).

In step 256, the illustrative example continues with the other user 202 sending a message to, or otherwise interacting with, place/service 205. In response, that place/service 205 may also update its own state information for that user, indicating that the user is active there. In step 257, the state information may once again be exchanged and updated between the places/services.

In step 258, user 201 may request that place/service 205 display for the user the state information of other users of the place/service 205. This request may be made by the user through, for example, clicking on an Internet page link for other users' (e.g., friends') status information, or the request may be made automatically for the user. In some alternative embodiments, the request may actually be made automatically after the user logs on. In step 259, place/service 205 may optionally transmit a request to the users, such as user 202, whose status information is about to be provided to the requesting user 201. If such a request is made, then step 260 may occur, with the user 202 providing his/her permission to have the status information shared.

In step 261, place/service 205 may transmit the requested user status information to the requesting user 201. This status information may be selected (e.g., filtered) by place/service 205 to account for degrees of relationship between the requesting user 201 and the other users (e.g., user 202), and on the degree of relationship between places/services 204/205. This filtering is discussed in greater detail below. In steps 262 and 263, this status information requesting may be repeated by the user 201 with the other place/service 204.

Figure 2C:
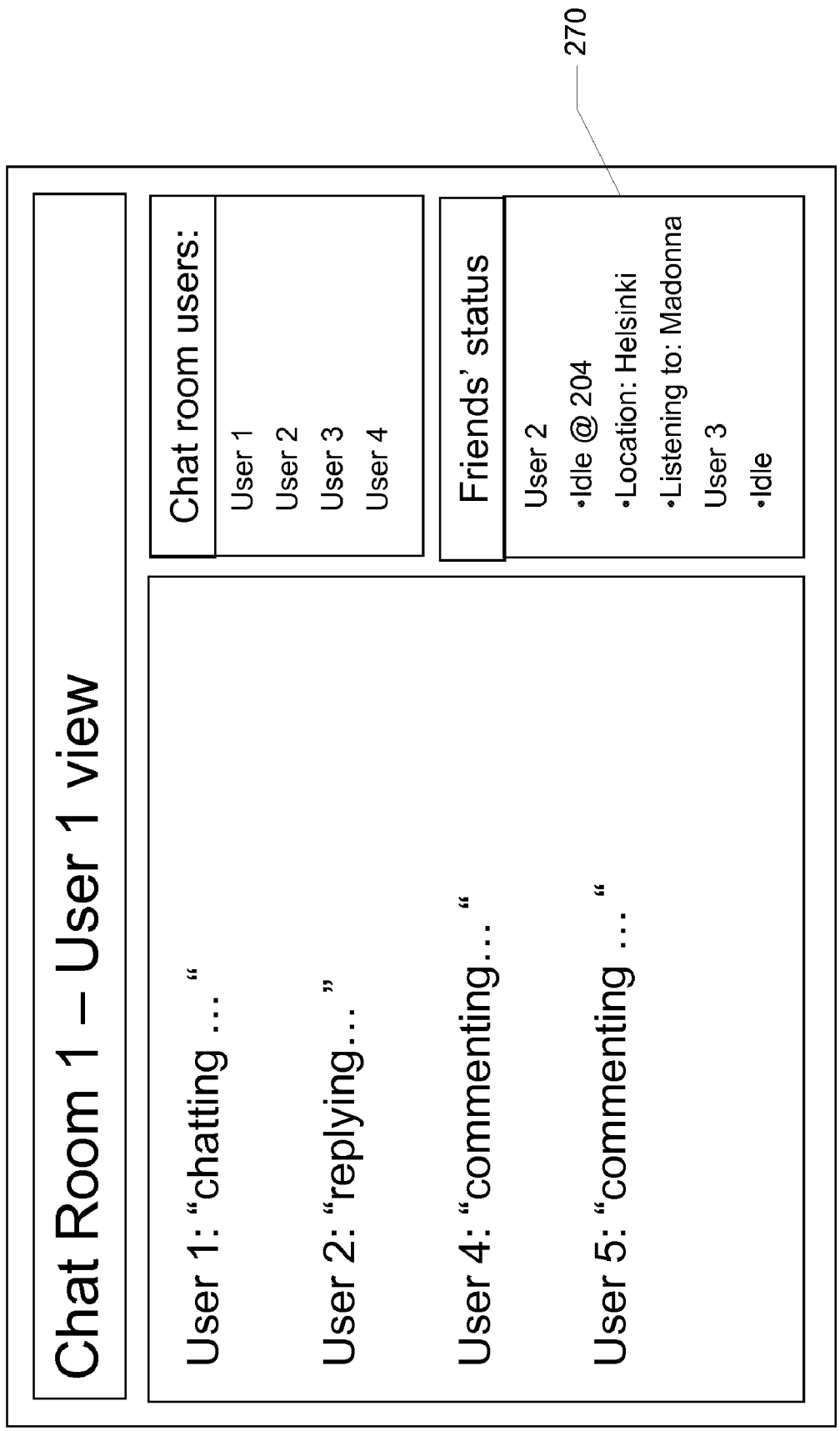
FIG. 2c illustrates an example communication service display interface.

The end result of the status information may be a listing displayed to user 201 on his/her computer. FIG. 2c illustrates an example display of a chat room (e.g., place/service 205), in which various users (1-4) may be chatting, commenting, etc. The display may include a Friend's Status portion 270 (e.g., a panel on a display screen), which may display status and presence information for users who are friends with, or otherwise associated with, the user 201. As will be discussed below, the level of information that user 201 may see of his/her friends may be dependent on the level of activity of those users at the place/service 205, the degree of relationship between user 201 and those other users, and the degree of relationship between the place/service 205 and the other places/services possessing status information for the other users.

The levels of activity described above may be established by the various places. For example, the software for place 204 may track certain types of actions, and may identify thresholds for those actions to define levels of activity. One place may track time elapsed since the user last clicked a link on a website, and may set thresholds for levels of activity based on that (e.g., less than five minutes since the user clicked, then the user is "active"; if more than five minutes but less than an hour, the user is "medium"; and if more than an hour, the user is "inactive"). Other types of activity can include the user receiving or sending a message, the user uploading or downloading a file, the user logging into or out of the place, or any other desired type of activity. The above types of activity are exemplary only and may be different from place to place and could be customized for any particular place or user.

Presence is a related concept to activity, and may be a subset of activity. While "activity" may refer to past actions taken (or not taken) by the user, "presence" may refer to the likelihood for future activity of the user, or the user's current status at the place, in view of one or more of those past actions. For example, if a user is primarily paying attention to the inbox at a first place, and is merely logged into a second one in the background, then the user can be more "present" at the first place than the second one, even if the user is not "active" at that first place (e.g., it may have been a long time since the user last posted, but the user is keeping an eye on the inbox, or the user intends to promptly respond to messages received at the first place's inbox).

Presence may be defined by the user. For example, a User 201 may indicate to other users in a place 204 that User 201 is "available" to communicate at that place, or that the User 201 is "only occasionally" checking the inbox at place 204.

Such presence information can be published to some or all others in a particular place, depending on the user's preference and/or the online place's configurations. A user's presence information can be the same in all places the user is active in or is a member of, or it can be customized for particular places for viewing by particular other users.

So far, the discussion above has addressed levels of activity (or presence) of users at certain places, and that level of activity can be used to determine what information is shared. But as noted earlier, degrees of relationships between two users, or between two online places, can also affect the information that is shared. FIG. 2 further illustrates examples of these relationships.

For example, a relationship 214 can be defined between place 204 and place 205, and another relationship 215 can be defined between place 205 and place 206. Although not shown, a relationship may or may not be defined between place 204 and 206. These relationships may be established by the users themselves, or they may be automatically configured by the software running the places. Additional detail on establishing relationships is provided further below.

Relationships between places may take on different degrees. In one aspect, as in the example above, a relationship can be binary: it can simply exist or not exist. In another aspect, relationships may take the form of a degree, or logical distance, providing a relative measure of relationship between two places. This measure of a relationship's degree or logical distance can be used to determine what amount of information is shared.

For example, places 204 and 205 may have a very close relationship 214, while places 205 and 206 may have a more distant relationship 215. This may result in User 201, active in place 205, receiving different amounts of information regarding other users who are using other places 204, 206. For example, place 205 has a close logical relationship 214 with place 204. Accordingly, users at place 205 may be permitted to receive detailed information from place 204 regarding the users at place 204. On the other hand, place 205 has a more distant relationship 215 with place 206. So users at place 205 may receive less detailed, more general, information from place 206 regarding users at place 206.

In yet another aspect, relationships may take the form of different categories, and the information exchanged between places may be filtered to take into account the category of the relationship between the places. For example, Relationship 214 may be defined as a "business" relationship, so places 204 and 205 may share higher degrees of "business" information about their users than other types of information.

The relationships need not be static. To the contrary, relationships may be varied over time, depending on the user and/or the places' preferences. For example, some relationships may be dependent on the date, the day of the week, or the time of day. For example, a "business" relationship may persist during the day between 9:00 A.M. and 5:00 P.M., Mondays through Fridays, except certain holidays, and may be extinguished outside of those hours.

In yet another aspect, a relationship between two places may take the form of an indirect relationship based on direct relationships of the two places with other places. For example, Relationship 214 and 215 may be direct relationships between places 204 and 205 and places 205 and 206 respectively. An indirect relationship between place 204 and 206 may then exist as the combination of direct Relationships 214 and 215. All of these various forms of relationships are by way of example only. Generally, a relationship may take almost any form; it could be similar to the examples above, a combination of the examples above, or it may take any other form that can be described by rules. A single relationship could further be described in terms of multiple relationships.

Relationships may also be defined between users. For example, User 201 may consider User 202 to be a closer friend than User 203. User 201 may inform place 205 of this fact, and place 205 may then use that fact to determine the amount of information about User 201 that is shared with Users 202 and 203.

As noted above, the relationships may be defined by the users, and they may be automatically defined. In one aspect of automatic definition, a method for determining a relationship is based on semantic commonality between two places. In this aspect, the software running an online place may include metadata parameters defining the type of place it is, the types of users it has, and other characteristics. Exemplary metadata may describe the purpose of the place, presence and activity of its users, or informational content of the place. When two places seek to automatically define their relationship, they may each compare their metadata values with the values of the other, and based on that comparison, each place may determine a logical distance between the two.

Comparing metadata for semantic similarity may be accomplished in a number of ways. In one aspect, comparison of metadata may take into account just metadata property types, just values of the properties, or both. Comparison may take into account all metadata for a particular set of places, or may take into account only certain categories of metadata. For example, only metadata related to "business" might be compared. Comparison may further be accomplished by simple matching of properties and values, or may be a more complex determination of degrees of difference between metadata. For example, place 204 and 205 and 206 may all have metadata with a property of "User Nationality". The values of this property may be "Finland" for place 204, "Italy" for place 205 and "United States" for place 206. One exemplary method may determine that there is no relationship between any of the places because none of the values match. Another exemplary method may determine that a distant relationship exists between place 206 and each of places 204 and 205 because each is a member of the World Trade Organization. The same exemplary method might find a close relationship between places 204 and 205, because each is a member of the European Union.

Metadata that is compared and used semantically to determine relationships between places may also be created in various ways. Metadata may be defined for a place by an administrator of the place or by the users of a place. It may also be automatically generated based on presence and activity data of users of the place or information residing in or transmitted through the place. Metadata may be specific to the place itself, in which all users of the place see the same metadata, or it may be specific to a user or a group of users in the place. As an example, a User 201 may upload a document to place 204, and attach to the document a tag with a "Topic" property with a value "classical music". Several other users may then edit the document, in which those users editing actions are then tagged as pertaining to "classical music". Place 205 may similarly have documents or data tagged as relating to "classical music" or similarly have users with actions tagged as relating to "classical music". An example method may then determine that a relationship exists between places 205 and 206, and that the relationship pertains only to "classical music". This relationship may be between the two places generally, or may be specific to users whose presence and activities are tagged as relating to "classical music."

While relationships between places may be automatically defined based on metadata and semantic commonality, in an alternate aspect, relationships between places may be manually defined by a user based on the user's own determination. As an example, User 202 may define relationships 214 and 215 in the form of logical distances, on a scale of one to three, with a "one" being the closest possible relationship and a "three" being the furthest possible relationship. User 202 may define relationship 214 to have a value of "one" and relationship 215 to have a value of "two". As such, users of a given place may receive more detailed information regarding users of other places that have close relationships, and less detailed information regarding users of other places that have distant relationships.

Figure 3:
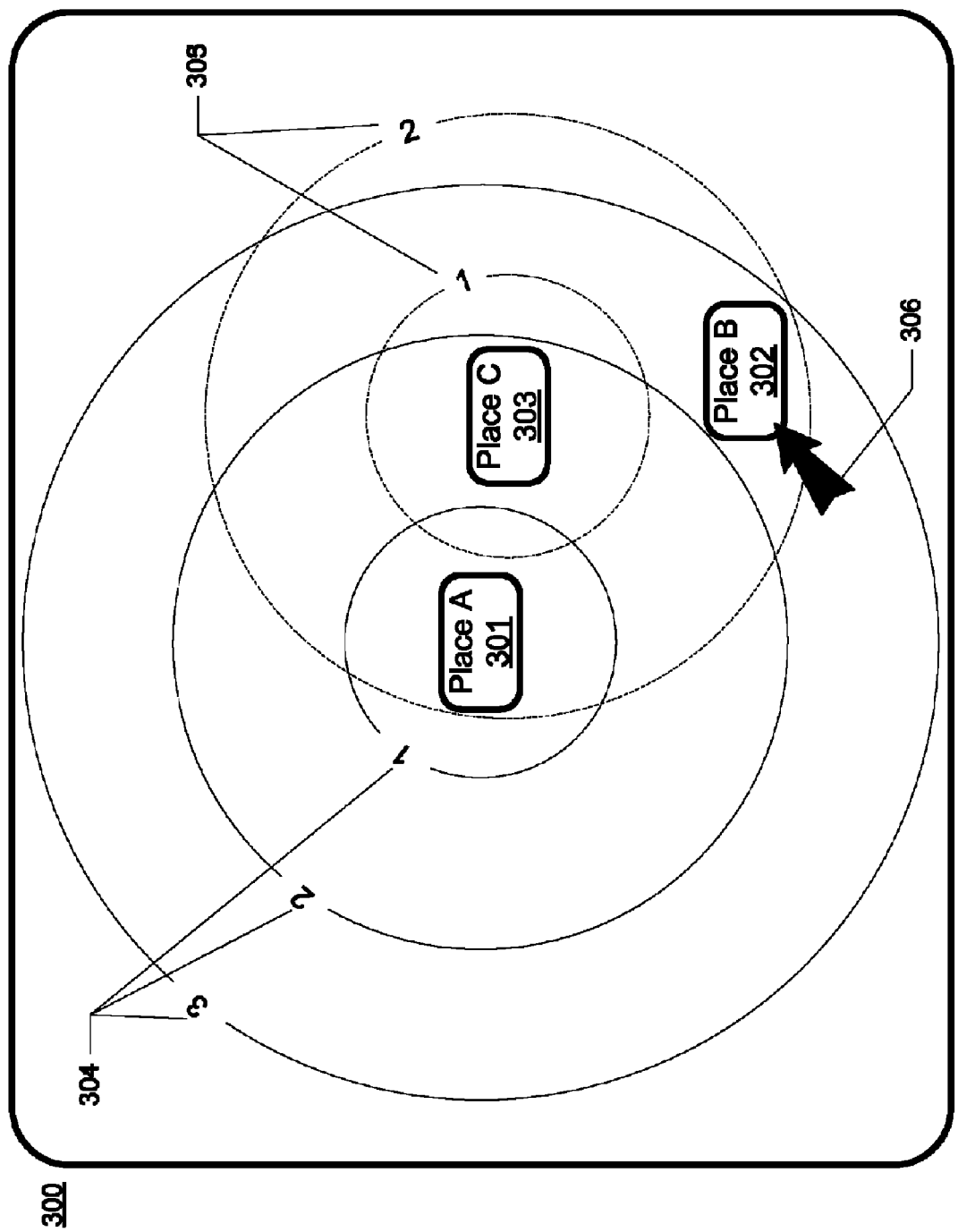
FIG. 3 illustrates an example user interface in defining logical distances between places.

Different methods may be employed to enable a user to define relationships between places. In one aspect, the user may describe relationships with text based rules or code that can be uploaded and interpreted by the places. In another aspect, a place may provide a user interface (UI) presented to a user on a System 100 to define relationships. The UI may consist of pull-down menus or selectable options for defining the relationships. In another aspect, the UI may be a two or three dimensional graph containing representations of the places. One example of such a UI is illustrated in FIG. 3. The UI 300 is a display illustrating a two-dimensional graph. Representations of places 301, 302, 303 are located on the graph with the distance between each representation 301, 302, and 303 representing the logical distance between the places. A user may move the representations 301, 302, and 303 using an input device (e.g., by clicking and dragging a mouse) to adjust the logical distances. The UI may contain a pointer 306 indicating where the input device is currently pointing.

The UI may further display specific values of distances as circles surrounding a representation of a place. For example, when the user is editing the logical distances for place A 301, circles 304 represent the various values of distance 1, 2, and 3. When the user is editing the logical distances for place 3, circles 305 represent the various values of distance. In this way, a user is aided in positioning places within specific distances of other places. After the user is finished positioning the representations, definitions of the relationships can be autonomously created based on the user's placement of the representations.

The discussion above illustrates various types of relationships and levels of activity that can be defined, and as noted above, these relationships and levels may be used to determine how much information about one user is shared with another. When a first place requests information from a second place regarding a particular user, the second place may consider some or all of the relationships and levels of activity described above, to determine how much (or little) of the particular user's information will be shared. Since each relationship may offer its own conclusion regarding how much information should be shared, the second place may sequentially perform separate tests of the various relationships, with weight values if desired, to ultimately determine how much information should be shared. For example, a first test may consider the second user's level of activity, while a second test may consider the logical distance between the two places. If the first test concludes that a "high" level of information should be shared (e.g., if the second user is very active at the first place), but the second test concludes that a "low" level of information should be shared (e.g., the two places are determined to be logically distant from one another), the second place may determine how best to combine these results. That combination can be done, for example, as a simple numeric average of number values assigned to the levels. As another example, the average can be weighted, so that one test has more effect on the result than the other test. These weights can be defined by the user, the places, or both.

The discussion above refers to determining how much of a user's information is to be shared, and to support this functionality, the user's information may also be divided into levels of information. For example, the user may define a very low, basic, level of information as simply the user's name. A next higher level of information may include the user's phone number and address information. A next higher level might include pictures of the user, or names of the user's family. An even higher level might include the user's credit card information. The levels may be defined in whatever manner is desired, and with however many levels as desired.

One type of personal information may include real-time positional information regarding the user's present whereabouts. For example, a global positioning service (GPS) may receive GPS data (e.g., via the user's GPS-enabled mobile phone) indicating the user's precise whereabouts. Places and/or other users who wish to know these whereabouts may receive that information with a level of precision that depends on the relationship testing referenced above.

Figure 4A:
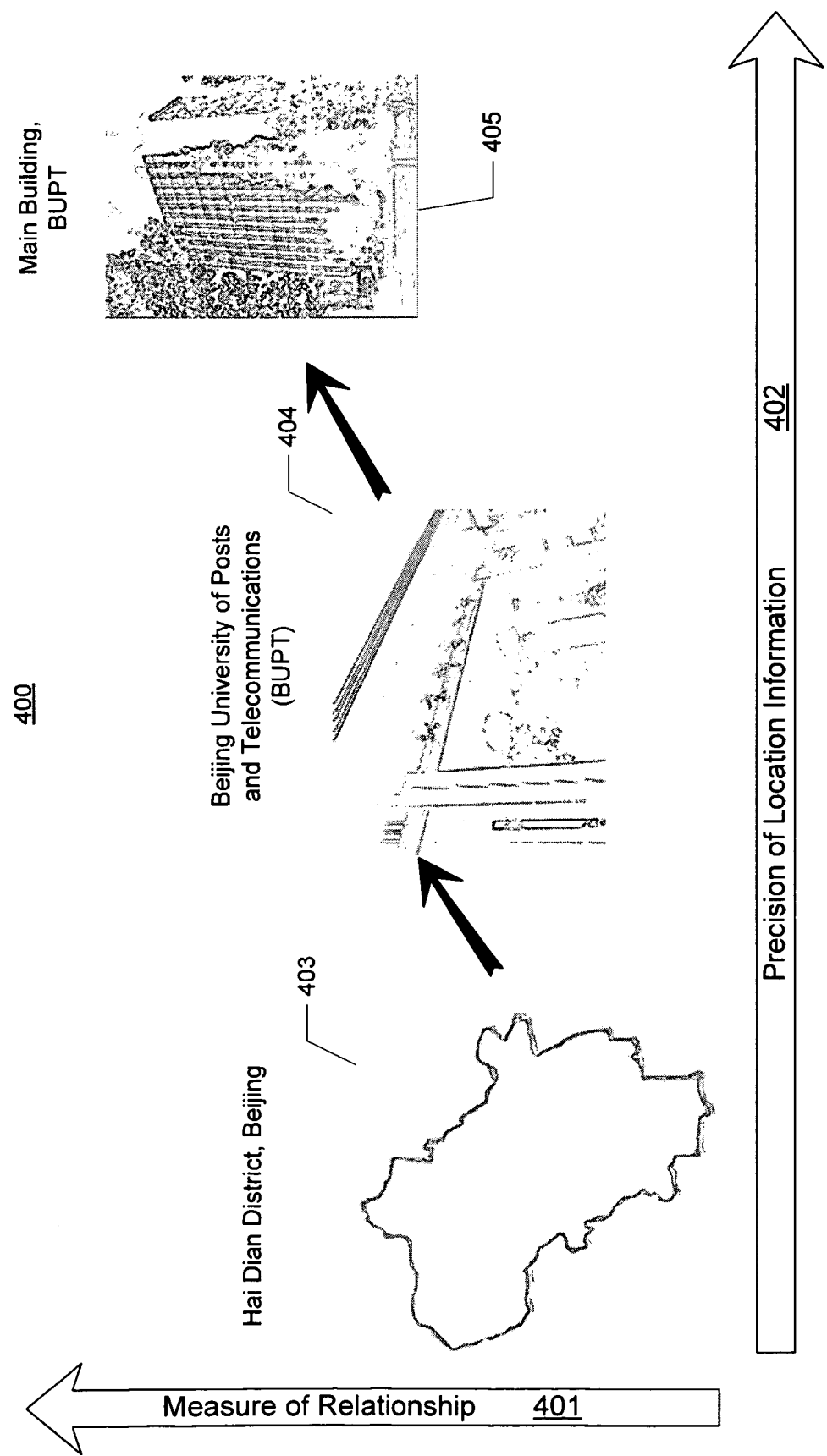
FIG. 4 illustrates an alternate example of location information at varying precision.

FIG. 4a illustrates, in one aspect, a hierarchy of user location data structured into increasing levels of precision. The lowest level of information 403 may simply identify the city in which the user is currently located (e.g., Hai Dian District, Beijing). The next higher level of information 404 may be more precise, indicating that the user is on the campus of Beijing University of Posts and Telecommunications. An even higher level of information 405 may identify the specific building on the campus where the user can be found Continuing with the location example, the location of User 201 may precisely be generated by a mobile device such as System 100 with a GPS receiver 108. As another illustrative example, the location of User 201 may be determined based on the cell location of a cellular network in which a mobile device such as System 100 is operating in. The location data at various precision levels might then be generated by User's 201 mobile device or might be retrieved from a local or remote server. In one aspect, the location data may be images such as 403, 404, and 405 that are stored in a database and retrieved for User 202 based on the determined location of User 201 and based on the relationship between the relative places User 201 and 202 are active in. The location data could be stored already organized into a hierarchy, with the exact location being location data at the top of the hierarchy. Alternatively the hierarchy could be determined at the time of the request for the location data.

Figure 4B:
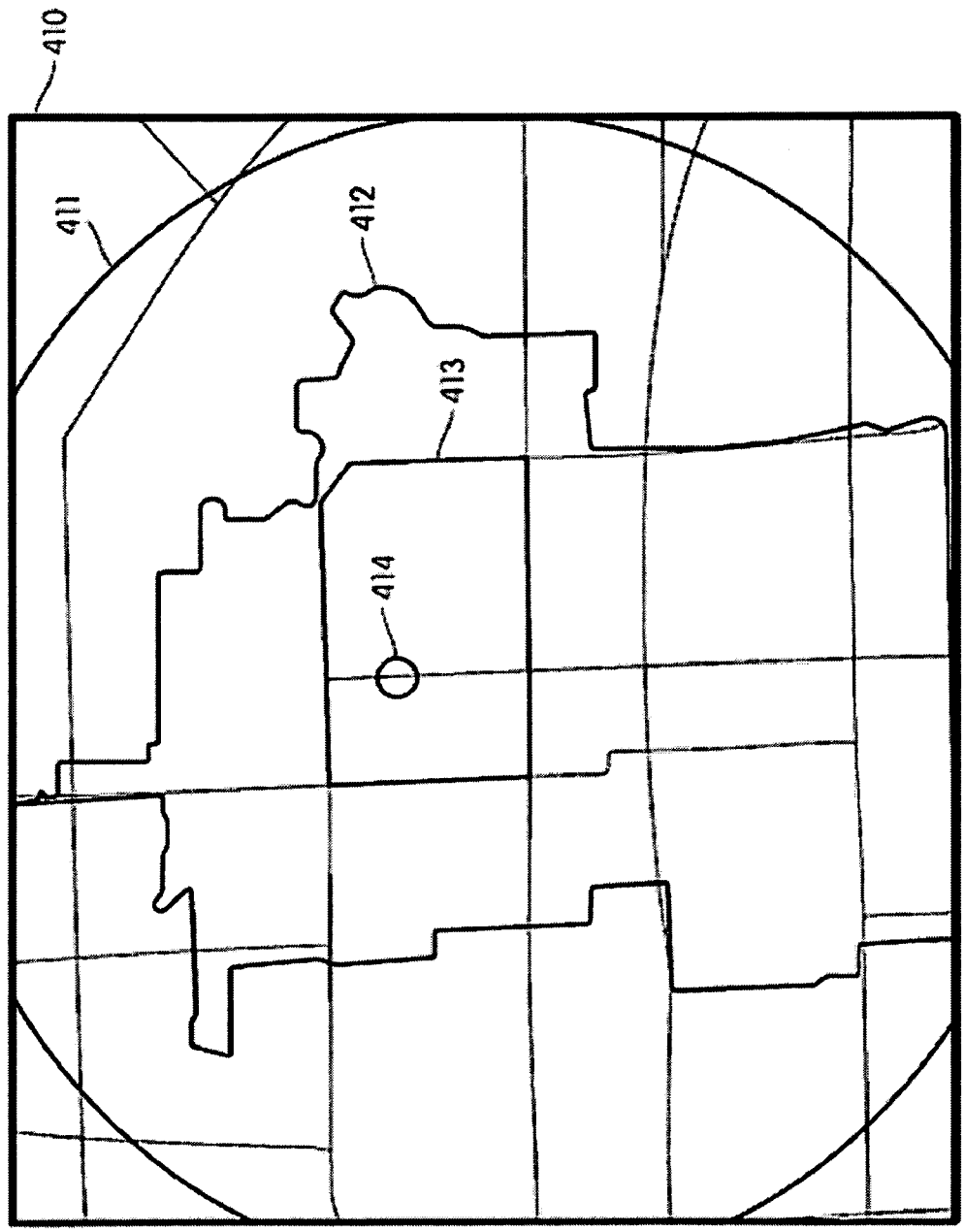

FIG. 4b illustrates an alternative illustrative example of location data of various precision. In this example, User 202 has requested that an online place provide location information for User 201. That online place may first consider the various relationship and activity level tests described above, and depending on the resulting level of information to be provided, the online place may supply the requesting User 202 with different levels of information. For example, the place may provide a map 410 to User 202, and tagged with metadata defining one or more markings 411-414 to highlight User 201's position. If, after comparing the relationships and levels of activity discussed above, User 201's place determines that only a low level of precision is warranted for User 202's request, then the place may simply provide a large area circle 411, informing the User 202 that User 201 is somewhere within that circle. If a higher level of information precision is warranted, the online place may supply User 202 with a more detailed marking 412, identifying a district, province, or county boundary in which the User 201 is located. If an even higher level of information precision is warranted, the online place may provide a marking 413 showing the city street or city block, and an even higher level of information precision may include a pinpoint location 414 showing the precise location of User 201.

Alternative examples of varying precision of location data that would fit within a hierarchical structure might be to provide User 201 images or video streams (live or recorded) at varying levels of resolution from the mobile device of User 202. Yet another example of varying precision of location data might be to provide a constant level of detail of location and activity information, but to provide the information at various levels of delay in time (e.g., high level is real-time, and low-level is significantly delayed).

Figure 5:
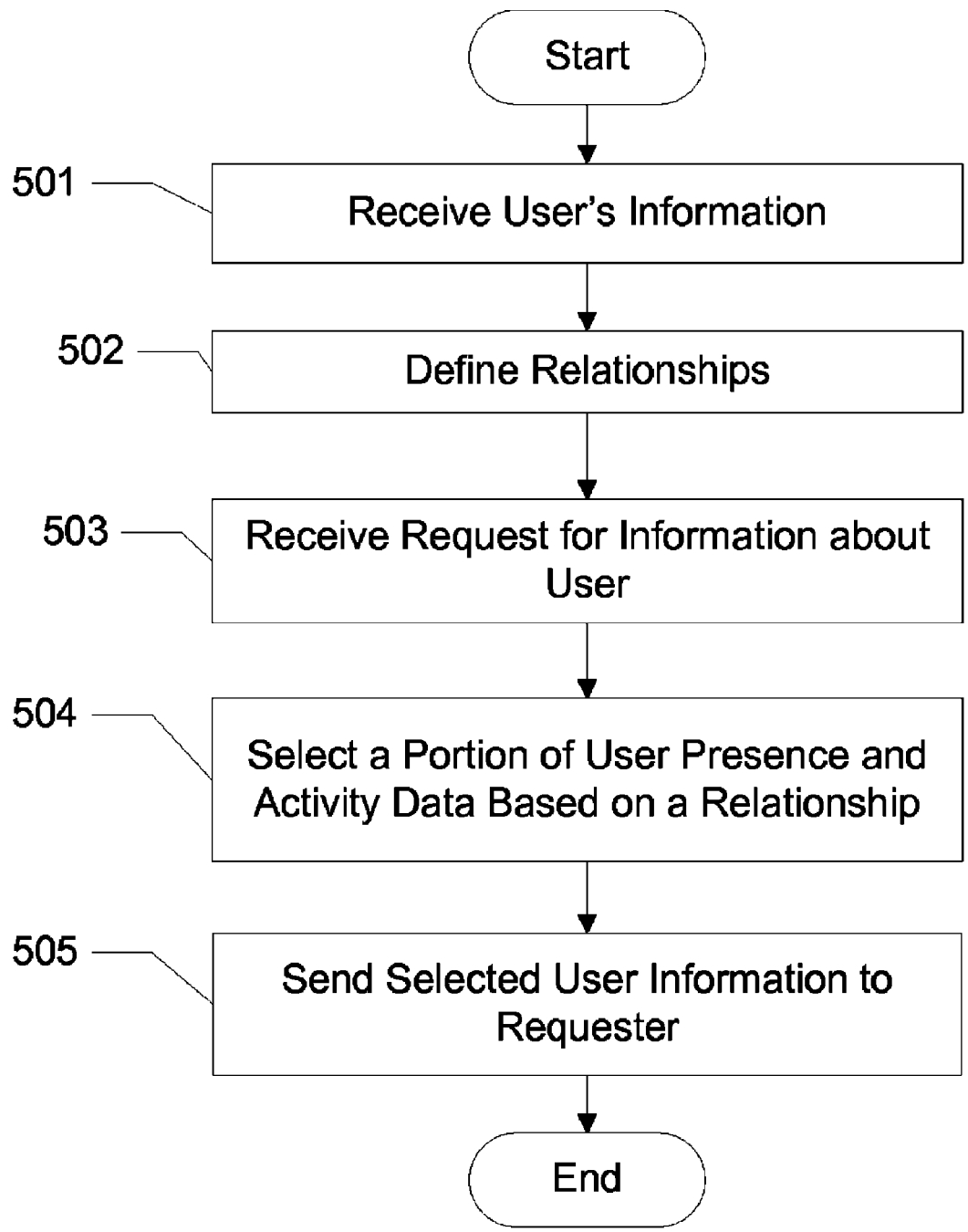
FIG. 5 illustrates an example method of sending user information based on a relationship.

FIG. 5 illustrates an exemplary method 500 by which information for a first user (e.g., User 201) may ultimately be shared with a requester. The method may be performed by an online service (e.g., a place 204) handling User 201's information. To begin, in step 501, the service may receive the User 201's information. This may involve prompting the user for various pieces of information, such as with an online form. The user may also assign the different pieces of information to different levels, as discussed above. The information may be stored by the service in a system memory (e.g., hard drive) until it is needed.

In step 502, the service may determine the relationships that will be analyzed when information about User 201 is requested. This may involve, for example, identifying the various tests desired (e.g., level of activity, logical distance between places, etc.), and establishing the various parameters that will be needed for those tests (e.g., assigning numeric values to levels of activity). This information may be obtained from the user, and may alternatively be automatically configured by the service.

When the user's information is known, and the desired relationships are known, the service may then be ready to handle requests for the user's information. In step 503, such a request may be received by the service. The request may originate from another user requesting the data, an online communication service or place, or any other entity. The request may also originate from a service aggregator that coordinates presence and activity data among several places and users. The request may be received by another online place servicing the user's information.

After receiving the request, the online place may, in step 504, conduct the necessary relationship tests and identify the information about User 201 that will be shared. Then, in step 505, that information may be sent to the requestor.

Figure 6:
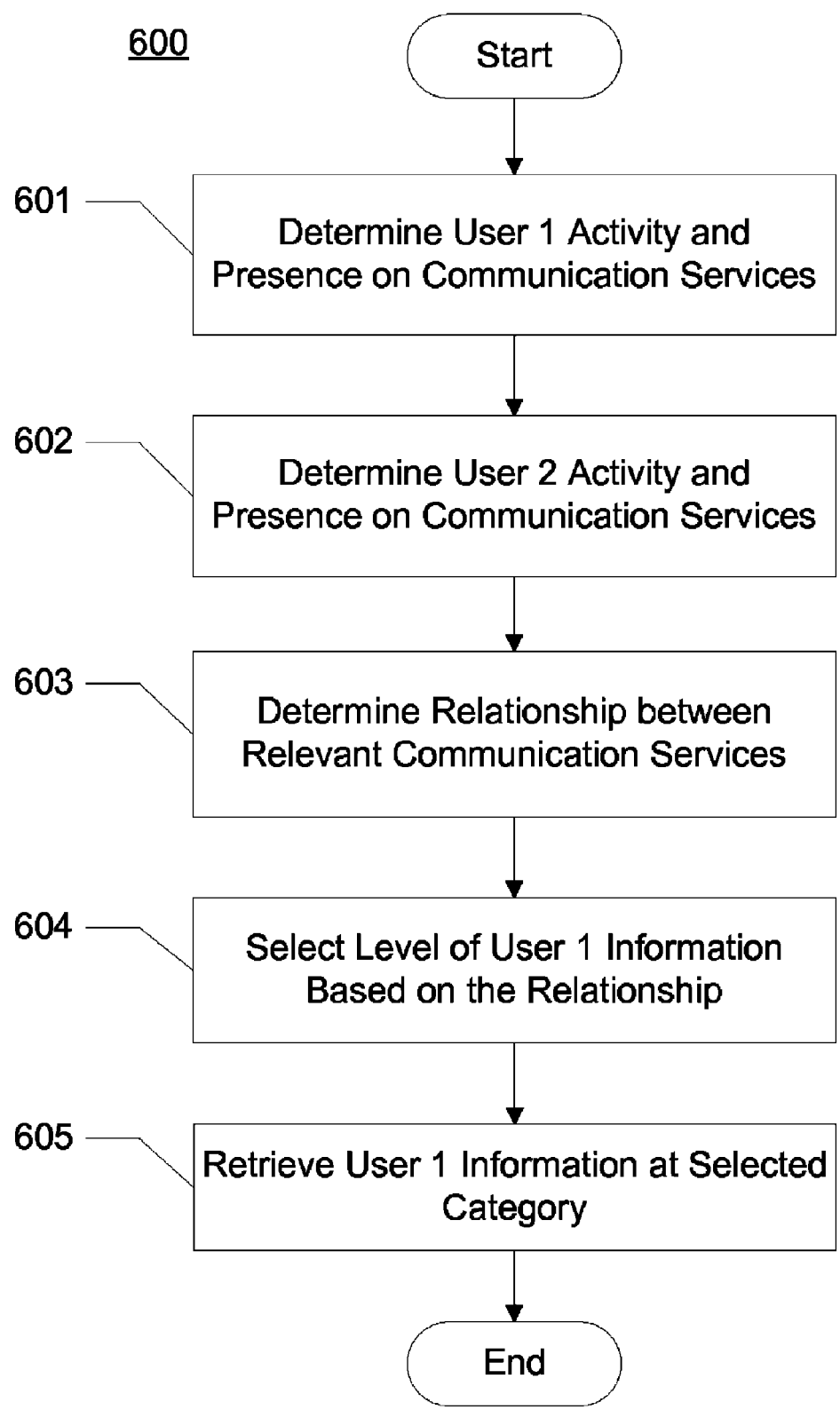
FIG. 6 illustrates an example method of retrieving user information based on a relationship between two communication services.

FIG. 6 illustrates an exemplary method 600 by which step 504 of FIG. 5 may be performed, in which a relationship between communication services (e.g. places) serves as the basis for determining which presence and activity information is presented. In steps 601 and 602, the users' respective services may determine levels of activity and presence of User 1 and User 2 respectively for a plurality of communication services or online places. These steps may be performed by the communication services themselves, by a terminal through which User 1 and User 2 interact with the communication services, by a service aggregator that coordinates information between communication services, by a system that hosts several of the plurality of the communication services, or any other processing system.

In step 603, the service may determine relationships between communication services on which User 1 and User 2 have presence and/or activity. Step 603 may calculate the relationships in real-time or retrieve predefined relationships from a database. When the activity level and relationships are known, the service may then, in step 604, run the various tests to be used, and determine the level of information precision about User 1 that is to be provided. Then, in step 605, the information at that level may be selected for transmission to the requestor. In this step, the information may also be filtered out to remove information that may be irrelevant to the relationship between the requestor and the service. For example, if that relationship is a "business" relationship, then the non-business User 1 information may be filtered out.

Steps of 600 may be performed in a variety of different orders than the order presented and may be divided into multiple other steps or combined into fewer steps. The steps of 600 may also be performed individually or combined with other methods as described herein.

Figure 7:
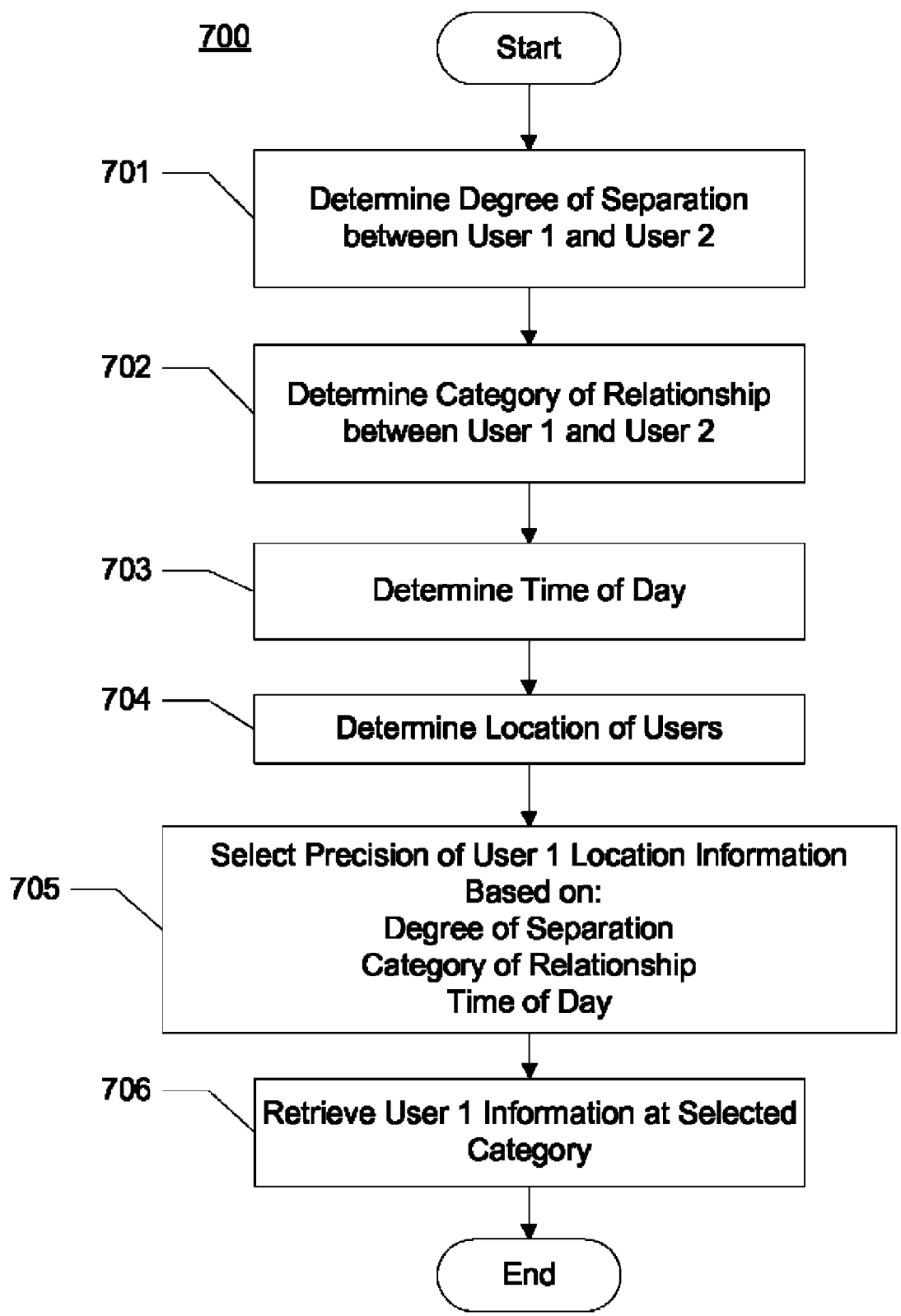
FIG. 7 illustrates an example method of retrieving user location information based on various parameters.

FIG. 7 illustrates an alternative exemplary method by which step 504 of FIG. 5 may be performed. In this method, a relationship is described as between User 1 and User 2. Multiple aspects of the relationship may be determined separately by steps 701, 702, and 703. Step 701 determines a degree of separation between User 1 and User 2. Degree of separation is a measure of a relationship between User 1 and User 2 based on common relationships with other users. For example, if User 1 and User 2 have a direct relationship (e.g. they communicate directly with each other through a social network service) they may be considered to be separated to the first degree. If they do not have a direct relationship with each other, but both have direct relationships with a User 3, they may be considered to have an indirect relationship and be separated to the second degree. If they both have direct relationships with two other people (e.g., Users 3 and 4) who, in turn, have a direct relationship with one another (e.g., Users 3 and 4 have a direct relationship), then Users 1 and 2 may be separated to a third degree. The direct relationships may be determined in any of the exemplary manners described herein and based on any sort of presence or activity information. For instance, one might determine direct relationships based on phone call history, contact lists, membership in common places, participation in communication channels, or exchange of data in communication channels. Determining a degree of separation may also take into consideration a measure (e.g. distance) of the direct relationships. Step 702 may optionally determine categories or types of relationships between User 1 and User 2. For example, relationships may be categorized into friends, family, co-workers, etc. Step 703 and 704 may optionally determine a time of day and/or location of the users respectively. Step 705 may then select precision of User 1 location data for providing to User 2 based on the degree of separation, category of relationships, time of day, and locations of User 1 and User 2. In an alternative aspect, step 705 may select other presence and activity data of User 1 based on the same relationship data.

Finally, step 706 retrieves the selected presence and activity information for User 1 to be provided for User 2. Steps of 700 may be performed in a variety of different orders than the order presented and may be divided into multiple other steps or combined into fewer steps. The steps of 700 may also be performed individually or combined with other methods as described herein. For example the steps of 600 and the steps of 700 could be combined in a variety of ways to provide presence data based on relationships between places and relationships between users.

The discussion above references the various places maintaining status (and other) information regarding various users. This information may be used to determine relationship degrees and distances for users and/or places. The information may be stored individually at the various computers hosting each respective place/service, or the information may be stored centrally at, for example, a relationship server computer communicatively coupled to the various host computers. The information may be stored in any desired format. The following table shows just one example format:

| User Info/Data ID | Anthony100 |
|---|---|
| Relationships | Relative, Neighbor |
| Activity | |
| Number of Services/Applications Accessed | 4 |
| Number of Accesses | 150 |
| Time Spent on Service (hrs) | 2300 |
| Service Accessed in Location X | 34 |
| Precision Location | High, Low, Intermediate |
| Services | |
| Share on Ovi | Yes |
| Nokia Maps | Yes |
| Video | Yes |
| Flickr | Yes |
| Distances of Services | Logical, 1, 2, or 3 |

In the above example, a separate table may be stored by a particular place/communication service for each user of the place/communication service (e.g., website, place, service, etc.). The table may store information identifying the level of the user's activity in any desired manner, such as number of applications accessed, number of accesses, duration of access, and services accessed at individual locations. For each other place/communication service listed, the table may also store an indication of the precision to which location information for the user (e.g., Anthony100) should be supplied.

The table may also list the individual services used by Anthony100, and for each service, the table may also store an indication of the distance between that service and the one storing the table. This distance may be expressed as a numeric degree, and may also be classified as a logical distance or real distance.

Other features described above include the following: A method comprising: determining a degree of relationship between a first social communication service and a second social communication service; transmitting, from the first service to the second service, selected information relating to a first user, the selected information being selected based at least in part upon the determined degree of relationship between the services.

Other features include the method above, further comprising: selecting the information based, at least in part, on a level of activity at the first service by the first user; the method above, further comprising: determining the degree of relationship based upon comparing metadata related to each of the first and second social communication services; the method above, further comprising: determining the degree based upon an input from the first user; the method above, wherein determining the degree comprises: providing, to a first user terminal for display, graphical information comprising icons representing the first and the second social communication services; and calculating the degree of relationship based upon the relative positions of the icons, wherein the relative positions are determined by the input from the first user; the method above, wherein the graphical information further comprises a plurality of zones around the icon representing the first or second social communication service, each of the zones representing one of a plurality of possible values of the degree of relationship; the method above, wherein the degree is a logical distance within a range of logical distances, wherein a level of detail of the selected information relates to the position of the logical distance within the range; the method above, wherein the selected portion of first information is location data of the first user; the method above, wherein when a closer degree of relationship is determined, the location data is of a higher precision than when a further degree of relationship is determined.

The features herein also include one or more computer-readable media, storing computer-executable instructions that, when executed by a computer, cause the computer to perform the various method features recited above. The features herein also include an apparatus having a processor configured to perform the various method features recited above.

The illustrative features described above are examples. The scope of the present application should not be limited to require all described features, but should rather only be limited by the claims that follow.

We claim:

1. A method comprising:
   determining a degree of relationship in a social network service between a first user and a second user; and
   causing, at least in part, transmission of information indicating a location, at a selected precision, of the first user, the selected precision being selected based at least in part upon the determined degree of relationship.

2. The method of claim 1, wherein the location information is Global Positioning System information.

3. The method of claim 1, wherein the location information includes a graphical representation of a location, and is tagged with metadata relating to the location.

4. The method of claim 1, wherein the degree of relationship is based upon a degree of separation between the first and second users in the social networking service.

5. A computer-readable storage medium carrying one or more sequences of one or more instructions which, when executed by one or more processors, cause an apparatus to at least perform the following steps:
   determining a degree of relationship in a social network service between a first user and a second user; and
   causing, at least in part, transmission of information indicating a location, at a selected precision, of the first user for use by the second user, the selected precision being selected based upon the determined degree of relationship.

6. The computer-readable storage medium of claim 5, wherein the location information is Global Positioning System information.

7. The computer-readable storage medium of claim 5, wherein the location information includes a graphical representation of a location, and is tagged with metadata relating to the location.

8. The computer-readable storage medium of claim 5, wherein the relationship is based upon a degree of separation between the first and second users in the social networking service.

9. An apparatus, comprising:
   at least one processor; and
   at least one memory including computer program code for one or more programs,
   the at least one memory and the computer program code configured to, with the at least one processor, cause the apparatus to perform at least the following,
   determine a degree of relationship in a social network service between a first user and a second user; and
   cause, at least in part, transmission of information indicating a location, at a selected precision, of the first user, the selected precision being selected based at least in part upon the determined degree of relationship.

10. The apparatus of claim 9, wherein the location information is Global Positioning System information.

11. The apparatus of claim 9, wherein the location information includes a graphical representation of a location, and is tagged with metadata relating to the location.

12. The apparatus of claim 9, wherein the relationship is based upon a degree of separation between the first and second users in the social networking service.

13. The apparatus of claim 9, wherein the apparatus is further caused to:
   determine a degree of relationship between a first social communication service and a second social communication service; and
   select the transmitted information based at least in part on the determined degree of relationship between the first and second social communication services.

14. The apparatus of claim 13, wherein the apparatus is further caused to:
   receive via a user interface the degree of relationship between the first and second social communication services.

15. The method of claim 1, further comprising:
   determining another degree of relationship between a first communication service in which the first user has presence and a second communication service in which the second user has presence,
   wherein the selected precision is selected further based at least in part upon the other degree of relationship.

16. The method of claim 15, wherein the other degree of relationship is determined based at least in part upon: semantic commonality between the first and second communication services, a logical distance between the first and second communication services, a comparison of user data associated with the first and second communication services, the presence of the first user in the first communication service, the presence of the second user in the second communication service, or a combination thereof.

17. The method of claim 15, wherein the first and second communication services include an instant messaging (IM) system, Internet relay chat (IRC) system, online chat service, text messaging service, webpage server, bulletin board system, social networking website, online community website, email server, professional networking service, photo sharing service, people locator service, or a combination thereof.

18. The method of claim 15, further comprising:
   causing, at least in part, presentation of the information indicating the location, at the selected precision, of the first user, wherein the selected precision is defined by a level of resolution, a level of time delay, or a combination thereof.

19. The method of claim 15, wherein a degree of separation between the first and second users in the social networking service depends, at least in part, upon contact lists of the first and second users in the social networking service, activities of the first and second users associated with the social networking service, presence of the first and second users in the social networking service, or a combination thereof.

* * * * *